United States Patent [19]
Baney et al.

[11] Patent Number: 6,157,753
[45] Date of Patent: Dec. 5, 2000

[54] PROGRAMMABLE LIGHT PATH DEVICE

[75] Inventors: Douglas M. Baney, Los Altos; Wayne V. Sorin, Mountain View, both of Calif.

[73] Assignee: Agilent Technologies, Inc., Palo Alto, Calif.

[21] Appl. No.: 09/316,501

[22] Filed: May 21, 1999

[51] Int. Cl.$^7$ .................................................... G02B 6/26
[52] U.S. Cl. .................................. 385/16; 385/4; 385/8; 385/122
[58] Field of Search ........................... 385/418, 16, 122; 359/321, 322; 349/196, 197

[56] References Cited

U.S. PATENT DOCUMENTS 5,596,671  1/1997  Rockwell, III ........................ 385/147

*Primary Examiner*—James Phan

[57] ABSTRACT

A switchable waveguide having first and second states. In the first state, the waveguide guides light of a signal wavelength along a predetermined path. In the second state, no guiding of the light occurs. The waveguide includes a guide layer of a guide material having a first index of refraction in the absence of an electric field and a second index of refraction in the presence of the electric field. The electric field is generated in a portion of the guide layer by applying an appropriate electrical signal to a plurality of electrodes that define a guide region in the guide layer. The guide region has an index of refraction that is greater than that of the guide layer in regions adjacent to the guide region. The electrodes are separated from the guide region by a distance of at least one-half times the wavelength of the light being guided. The separation is maintained by arranging the electrodes such that the guide region is created at a location separated from the electrodes.

7 Claims, 3 Drawing Sheets

PROGRAMMABLE LIGHT PATH DEVICE

FIELD OF THE INVENTION

The present invention relates to light guides, and more particularly, to programmable light guides based on liquid crystals.

BACKGROUND OF THE INVENTION

Data communication systems based on fiber optics provide substantially higher bandwidth than systems based on electrical systems. Unfortunately, switching devices for switching optical signals between an input fiber and a plurality of output fibers have not kept pace. As a result, optical signals are typically converted back to electrical signals prior to switching. The electrical signals are then switched using conventional packet switching techniques and reconverted to optical signals prior to entering the output fibers. The limitations of electrical switching systems prevent the realization of the full data bandwidth of the fibers. Accordingly, a significant amount of research has gone into developing optical switches that avoid the conversion of the light signals back to electrical signals.

One promising method for switching optical signals between optical paths relies on a waveguide whose location is electrically controlled. A waveguide may be generated by altering the index of refraction of a medium along the path over which the light is to travel such that the desired path has a higher index of refraction than the surrounding medium. Devices based on liquid crystals are particularly attractive because of the large change in index of refraction for light of a predetermined polarization that can be induced in a liquid crystal layer by applying a low frequency AC electrical field across the layer. A simple switching device can be constructed by energizing one set of electrodes on the surface of the liquid crystal layer while leaving an alternative set in a non-energized state. The region between the energized electrodes then becomes the waveguide that specifies the direction in which the light signal will propagate in the liquid crystal layer.

To construct a practical switching device based on such a configurable waveguide, the light losses must be acceptable and the operating voltages must be in the range obtainable with conventional integrated circuits. The light losses depend on the transparency of the liquid crystal layer at the wavelength of the light signal being switched and on the interaction of the evanescent electric field associated with the signal and the electrodes that define the guided light path. While sufficiently transparent liquid crystal materials are known, the designs utilized in the systems proposed to date rely on electrodes that are close to the light guide. The evanescent field of the guided light extends outside of the light guide. If this field overlaps the electrodes, energy is transferred from the light signal to the electrodes, which reduces the intensity of light in the guide.

One method for reducing the overlap of the evanescent field and the electrodes is to provide a buffer layer between the electrode and the liquid crystal layer. Such a buffer layer must have a significantly lower index of refraction than the liquid crystal medium under the electrodes when the field is on. Hence, only a fraction of the driving voltage actually appears across the liquid crystal layer. To overcome this voltage divider, the driving voltages generated by the driving circuits must be increased to levels above those provided by conventional low cost integrated circuits.

Broadly, it is the object of the present invention to provide an improved optical switching element.

It is a further object of the present invention to provide an optical switching element that reduces the optical losses associated with the interaction of the evanescent field of the guided light and the electrodes that define the path of the guided light.

These and other objects of the present invention will become apparent to those skilled in the art from the following detailed description of the invention and the accompanying drawings.

SUMMARY OF THE INVENTION

The present invention is a switchable waveguide having first and second states. In the first state, the waveguide guides light of a signal wavelength along a predetermined path. In the second state, no guiding of the light occurs. The waveguide includes a guide layer of a guide material having a first index of refraction in the absence of an electric field and a second index of refraction in the presence of an electric field. The electric field is generated in a portion of the guide layer by applying an appropriate electrical signal to a plurality of electrodes that define a guide region in the guide layer. The guide region has an index of refraction that is greater than that of the guide layer in regions adjacent to the guide region. The electrodes are separated from the guide region by a distance of at least one-half times the wavelength of the light being guided. The electrodes are preferably planar conducting sheets that are driven by an AC signal characterized by a driving frequency. In one embodiment, the first and second electrodes are separated from the guide region by a transparent buffer layer having an index of refraction less than the second index of refraction, the first and second electrodes being on opposite sides of the guide layer with the guide region underlying one of the first and second electrodes. The buffer layer preferably has a dielectric constant greater than the dielectric constant of the guide layer at the driving frequency and a dielectric constant less than the dielectric constant of the guide layer at the signal wavelength. Embodiments in which the first and second electrodes are disposed on the same side of the guide layer and the guide region is located between the first and second conducting sheets may also be constructed. In these embodiments, the guide region is separated from the electrodes by a buffer region consisting of the guide material.

DETAILED DESCRIPTION OF THE INVENTION

Figure 1:
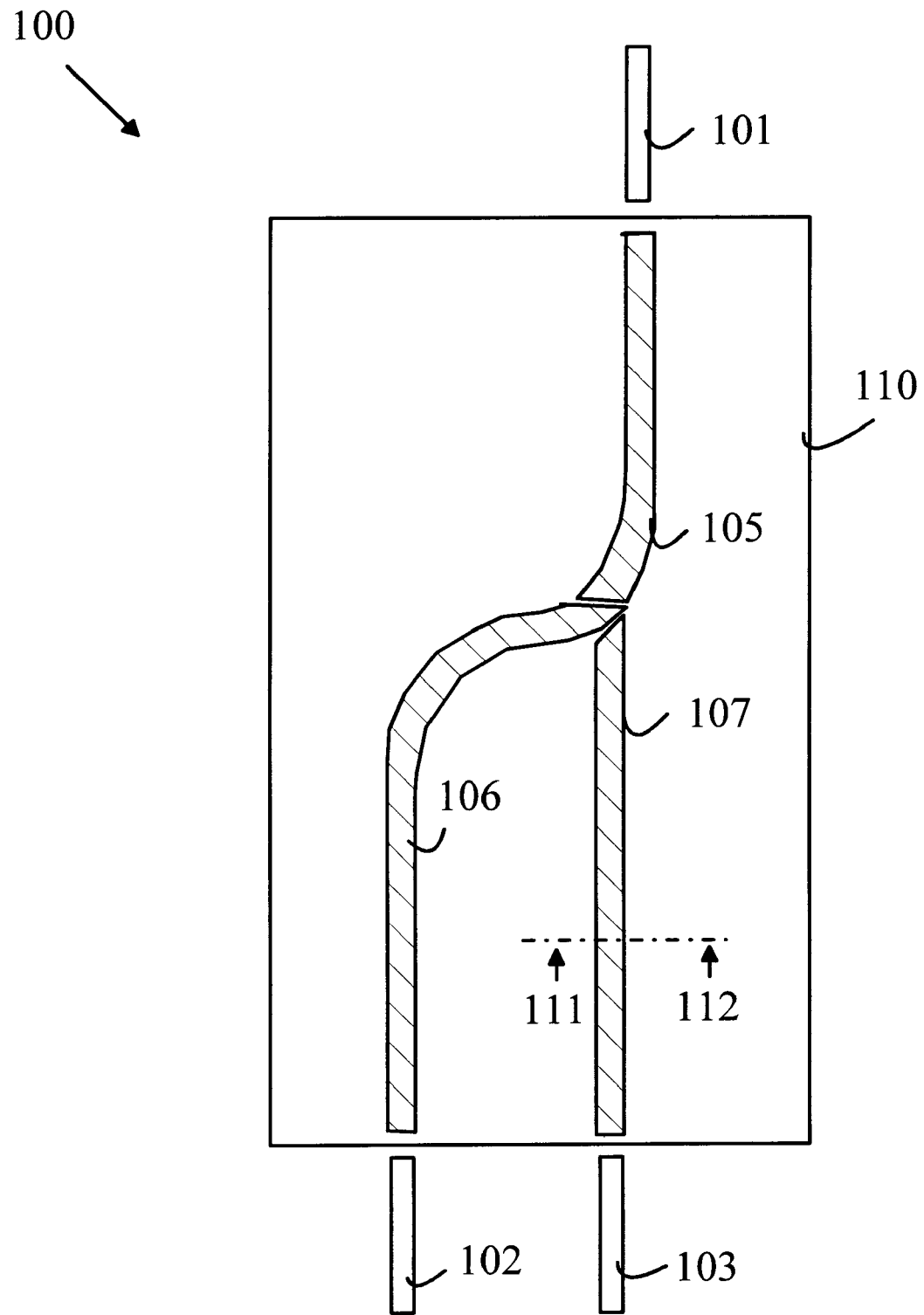
FIG. 1 is a top view of a prior art switching device 100 for switching light signals from an input fiber 101 to either fiber 102 or 103.

The manner in which the present invention provides its advantages may be more easily understood with reference to FIG. 1, which is a top view of a prior art switching device 100 for switching light signals from an input fiber 101 to either fiber 102 or 103. The switch utilizes a liquid crystal layer 110 in which two paths may be defined by applying an appropriate potential on electrodes 105–107. The first path connects fibers 101 and 102 by generating a light guide under electrodes 105 and 106. The second path connects fibers 101 and 103 by generating a guide under electrodes 105 and 107.

Figure 2:
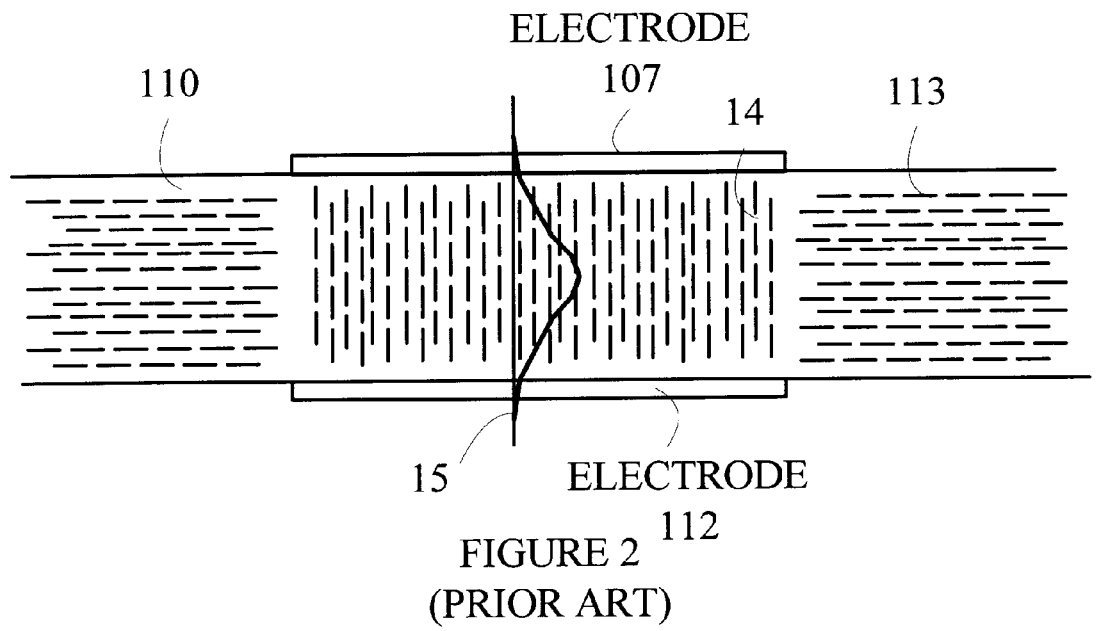
FIG. 2 is a cross sectional view of the switching arrangement shown in FIG. 1 through line 111–112.

Refer now to FIG. 2 which is a cross sectional view of the switching arrangement shown in FIG. 1 through line 111–112. The liquid crystal waveguide operates by creating a region under an energized electrode in which the index of refraction is greater than that in the surrounding liquid crystal medium. An AC field is applied across a portion of a liquid crystal layer 110 to change the orientation of the liquid crystal molecules in the applied field as shown at 14. Coupling an appropriate signal generator between electrodes 107 and 112 generates this field. A liquid crystal alignment layer is applied to the walls of the chamber that causes the crystals to be aligned as shown at 113 in the absence of an electric field. When an electric field is applied, the liquid crystals that are not in contact with the crystals on the walls are re-oriented to the direction of the electric field. When the field is removed, the liquid crystals reorient themselves with the crystals in contact with the walls of the chamber. An AC field is utilized to switch the direction of orientation because a DC field would result in the ions within the liquid crystals drifting toward one of the electrodes over time.

Thus the generation of an electric field between the electrodes results in a region that has a higher index of refraction for light having a polarization that is perpendicular to the orientation direction of the liquid crystals, and hence, light of this polarization passing through this region will be guided. A polarization filter may be utilized to assure that only light of the desired polarization is present. When the field is not applied, there is no light guiding effect.

The generation of the liquid crystal alignment layer is well known in the art, and hence, will not be discussed in detail here. For the purposes of the present invention, it is sufficient to note that the walls of the chamber can be textured such that the molecules of the liquid crystal will assume a specific orientation at the wall. For example, if the molecules are to assume an orientation parallel to the wall surface, the wall surface can be coated with a material that is then textured by rubbing to produce small grooves. The liquid crystal molecules will align themselves in the grooves, provided the material is one in which the liquid crystals will wet the wall surface. If a non-wetting coating material is utilized, the liquid crystal molecules will align themselves perpendicular to the wall to minimize the interactions with the wall.

In the prior art system shown in FIGS. 1 and 2, the light guided region is defined by electrodes consisting of conducting pads on the boundary of the liquid crystal area that is to be switched. This arrangement has problems due to losses resulting from the proximity of the electrodes to the waveguide area. The wave function 15 of the guided light extends beyond the waveguide area into the electrodes. As a result, energy is transferred from the light into the electrodes resulting in lost intensity in the guided light signal. The present invention reduces such losses by isolating the waveguide region from the electrodes.

Figure 3:
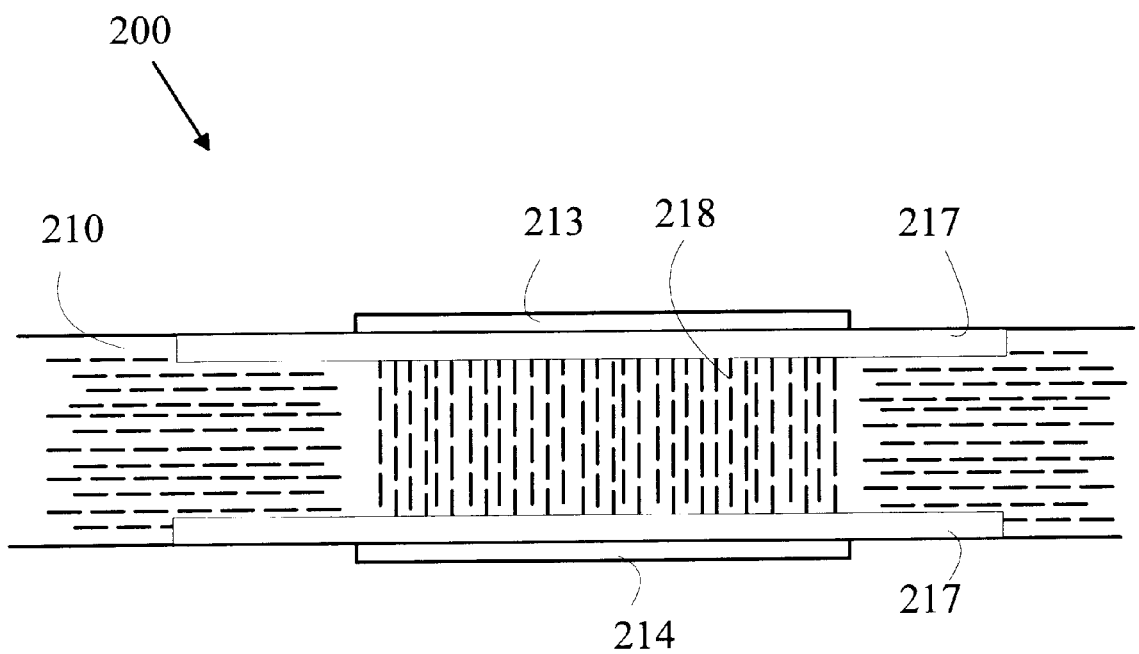
FIGS. 3 is, a cross-sectional view of a first embodiment of a switching element 200 according to the present invention.

Refer now to FIG. 3, which is a cross-sectional view of a first embodiment of a switching element 200 according to the present invention. Switching element 200 utilizes a low index of refraction buffer region 217 to separate the light guiding region 218 in liquid crystal layer 210 from electrodes 213 and 214. The buffer regions must be transparent to the light and must have an index of refraction that is less than that in the light guide region at the wavelength of the guided light.

As noted above, this type of isolation increases the operating voltage of the device. From the standpoint of the driving circuit, the device appears to be a circuit consisting of three capacitors in series. The liquid crystal area is the middle capacitor. It must be driven through the outer capacitors; hence, the voltage appearing across the liquid crystal area is reduced. The extent of the reduction depends on the dielectric constants of the liquid crystal and buffer materials at the frequency of the AC signal applied to the electrodes and the relative thickness of the layers. Ideally, the outer capacitors would have much higher capacitances than the liquid crystal region, thereby assuring that almost all of the drive voltage appears across the liquid crystal region.

The ratio of the capacitances of the isolation region and liquid crystal region is proportional to the ratio of the dielectric constants and inversely proportional to the ratio of the relative thickness of the regions. Hence, the ideal device has a buffer region that is thin compared to the liquid crystal chamber thickness and a dielectric constant that is much greater than that of the liquid crystal material. The minimum thickness for the buffer region is set by the distance that the evanescent field extends beyond the liquid crystal region. The extent of this evanescent field is on the order of the wavelength of the guided light. Hence, a buffer layer that is thicker than at least one-half of the wavelength of the guided light is sufficient. This will assure that propagation loss due to absorption by the electrodes is less than the loss due to scattering and absorption by the liquid crystal medium.

The maximum thickness of the buffer regions is determined by the maximum driving voltage that can be applied to the electrodes. In embodiments in which the light guiding region sandwiched between the electrodes as shown in FIG. 3, the potential needed to switch the liquid crystals is determined by the thickness of the liquid crystal layer and the liquid crystal material. The maximum voltage that can be cost-effectively applied across the electrodes is determined by the driving circuits and the break down voltages along the paths between the driving circuitry and the electrodes. If conventional integrated circuitry is used for the driving circuits, the optimum driving voltages will be less than 10 volts, and preferably, less than 5 volts. Accordingly, the buffer region must be constructed such that a substantial fraction of the driving voltage appears across the liquid crystal layer. In the preferred embodiment of the present invention, at least 25% of the driving voltage appears across the liquid crystal layer.

The material from which the buffer layer is constructed also determines the dielectric constant of the buffer layer. As noted above, the index of refraction of the buffer region must be less than that of the liquid crystal material at the optical wavelength being guided. Since the dielectric constant is a monotonic function of the index of refraction, these requirements would seem to be contradictory.

One embodiment of the present invention is based on the observation that the dielectric constant of the buffer region only needs to be much larger than that of the liquid crystal material at the frequency of the AC signal. In the preferred embodiment of the present invention, a material having a very high dielectric constant at low frequencies, but a low dielectric constant at optical frequencies is utilized.

Perovskite ferroelectrics such as those based on lead zirconium titanate (PZT) have this property. Layers of these materials have domains that switch with the applied electric fields. Such materials exhibit very high dielectric constants at frequencies at which the domains can switch in synchrony with the applied field, i.e., at frequencies less than 1 GHz. At frequencies above this range, the domains cannot switch and the effective dielectric constant decreases by one to two orders of magnitude. Hence, the buffer layer capacitance at the driving frequency of the signal generator can be an order of magnitude higher than that of the liquid crystal region while still providing a buffer layer having a lower index of refraction than that of the liquid crystal region.

Figure 4:
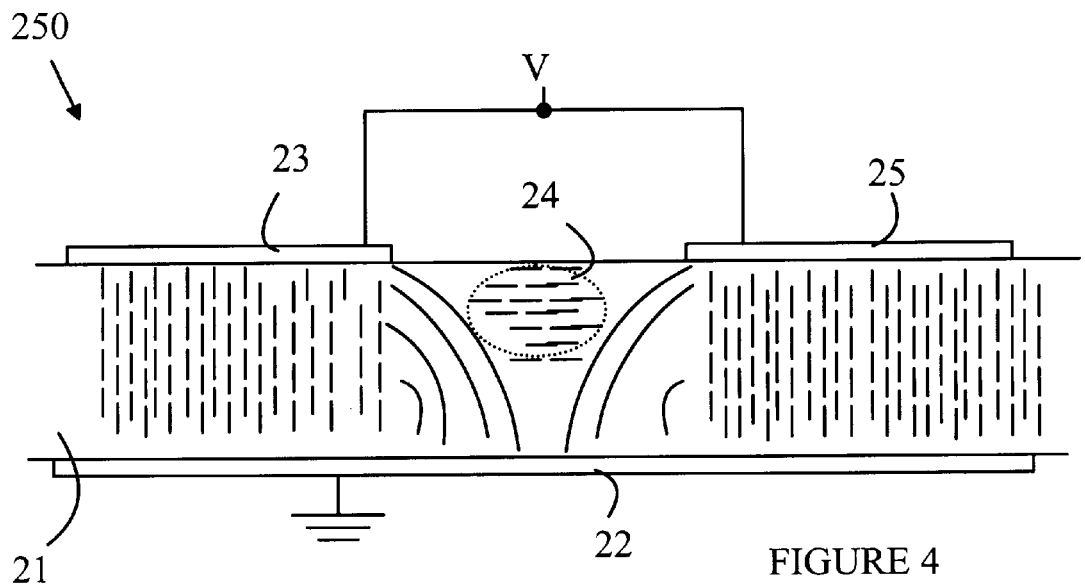
FIG. 4 is a cross-sectional view of a second embodiment of a switchable light guide according to the present invention.

A second method for isolating the guided region from the electrodes utilizes an electrode arrangement that generates a guided region that is not adjacent to any of the electrodes. In these embodiments of the present invention three or more electrodes are used to define a region of higher index of refraction that is spaced apart from the electrodes by a sufficient distance to prevent the evanescent field from reaching the electrodes. Refer now to FIG. 4, which is a cross-sectional view of a second embodiment of a switchable light guide 250 according to the present invention. In this embodiment, electrodes 23 and 25 are placed on one surface of the liquid crystal chamber 21, and a third electrode 22 is placed on the other surface. Electrodes 23 and 25 are held at the same potential, denoted by V. Electrode 22 is held at a second potential, shown as ground in the figure. In this embodiment, the liquid crystals are aligned by preparing the wall of the chamber such that the molecules align as shown in region 24 when no potential is placed across the chamber. When a potential is placed across the chamber, a field is generated in the regions adjacent to region 24 that aligns the molecules in directions perpendicular to those in region 24. Accordingly, region 24 will be bounded by a region of lower index of refraction when potential is applied. This embodiment relies on the surface of the chamber to provide the alignment direction in the guided region when the field is applied and when the field is switched off in the chamber.

Figure 5:
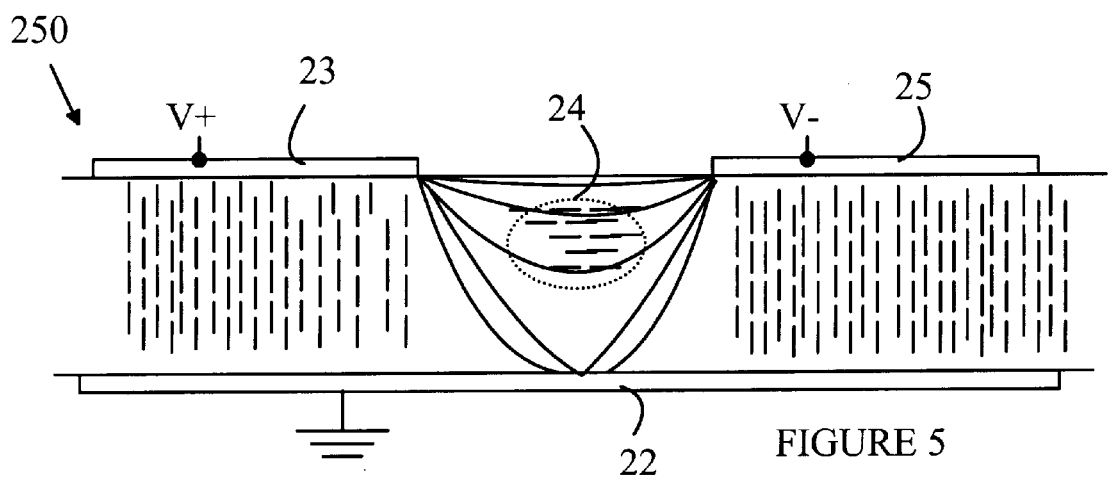
FIG. 5 illustrates the alignment of the liquid crystals when electrodes 23 and 25 shown in FIG. 4 are driven so as to be out of phase with one anther.

The electric field can be used to re-enforce the alignment of the liquid crystals in the guided region by applying opposite potentials between the two top electrodes as shown in FIG. 5. FIG. 5 illustrates the alignment of the liquid crystals when electrodes 23 and 25 shown in FIG. 4 are driven so as to be out of phase with one another. While the potentials are shown as V+ and V−, it is to be understood that the electrodes are connected to an AC signal generator such that the electrode potentials are 180 degrees out of phase.

Figure 6:
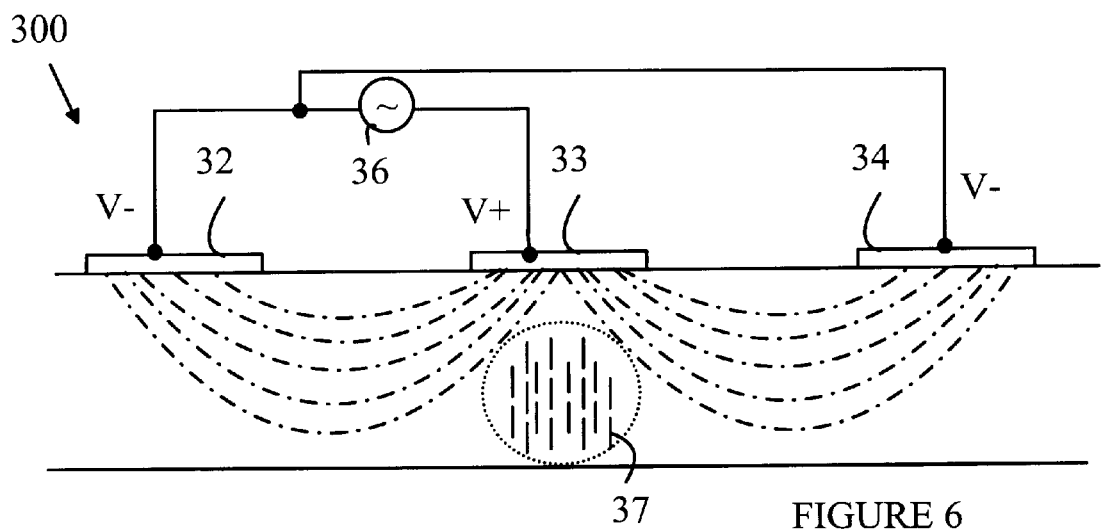
FIG. 6 is an embodiment of the present invention in which the electrodes are all on the same side of the liquid crystal chamber as shown at 300.

An embodiment of the present invention in which the electrodes are all on the same side of the liquid crystal chamber is shown in FIG. 6 at 300. Electrodes 32 and 34 are connected together. A signal generator 36 is connected to the electrodes and provides an AC signal such that electrode 33 is 180 degrees out of phase with respect to electrodes 32 and 34. This arrangement generates a guide region as shown at 37. The arrangement shown in FIG. 6 is particularly useful in situations in which the driving circuitry is constructed in a silicon substrate and the liquid crystal layer is located adjacent to the substrate. Since all of the AC electrical connections are on the same side of the liquid crystal layer, the electrodes can be connected directly to the driving circuitry without requiring vias through the liquid crystal layer.

The above-described embodiments of the present invention utilize a liquid crystal light guiding medium. However, it will be obvious to those skilled in the art from the preceding discussion that any transparent material in which the index of refraction can be altered sufficiently by applying an electric field may be utilized. Liquid crystals are preferred because of the relatively large change in the index of refraction obtained when the orientation of the crystals is rotated.

Various modifications to the present invention will become apparent to those skilled in the art from the foregoing description and accompanying drawings. Accordingly, the present invention is to be limited solely by the scope of the following claims.

What is claimed is:

1. A switchable waveguide having first and second states, said waveguide guiding light characterized by a signal wavelength along a predetermined path in said first state while providing no guiding of said light in said second state, said waveguide comprising:

a guide layer of a material having a first index of refraction in the absence of an electric field and a second index of refraction in the presence of said electric field; and a plurality of electrodes for applying said electric field to a portion of said layer, said electrodes defining a guide region in said layer having an index of refraction that is greater than that of said guide layer in regions adjacent to said guide region, said electrodes being separated from said guide region by a distance greater than one-half times said signal wavelength.

2. The waveguide of claim 1 wherein said material comprises liquid crystals.

3. The waveguide of claim 1 wherein said plurality of electrodes comprises first and second electrodes comprising planar conducting layers, said electrodes being driven by an electrical signal characterized by a driving frequency.

4. The waveguide of claim 3 wherein said first and second electrodes are separated from said guide region by a buffer layer comprising a transparent buffer material having an index of refraction less than said second index of refraction, said first and second electrodes being on opposite sides of said guide layer, said guide region underlying one of said first and second electrodes.

5. The waveguide of claim 4 wherein said transparent buffer material has a dielectric constant greater than the dielectric constant of said guide layer at said driving frequency and a dielectric constant less than the dielectric constant of said guide layer at said signal wavelength.

6. The waveguide of claim 3 wherein said first and second electrodes are disposed on the same side of said guide layer, said guide region being located between said first and second electrodes.

7. The waveguide of claim 3 further comprising a third electrode, said third electrode being disposed on the same side of said guide layer as said first and second electrodes, said guide region underlies said second electrode and is spaced apart from said second electrode when said first, second, and third electrodes are driven by a predetermined AC signal.

* * * * *